Patented Nov. 1, 1938

2,135,044

UNITED STATES PATENT OFFICE

2,135,044

POUR INHIBITOR AND METHOD OF MANUFACTURING THE SAME

Jeffrey Hobart Bartlett and Anthony H. Gleason, Elizabeth, N. J., assignors to Standard Oil Development Company, a corporation of Delaware No Drawing. Application July 14, 1934, Serial No. 735,198

5 Claims. (Cl. 260—671)

The present invention relates to lubricating oil modifying agents especially to an improved method for manufacturing materials which serve as pour inhibitors, as aids for the separation of waxy constituents from hydrocarbon oils, as sludge dispensers and the like. The invention will be fully understood from the following description:

It is known that an excellent lubricating oil wax modifying agent may be prepared according to the method described in United States Patent No. 1,815,022. Briefly, this method consists in the low temperature aluminum chloride condensation of halogenated paraffin wax with naphthalene. The material produced according to this method is excellent in quality but the yield is not large. The present method produces a modifying agent which, while it is believed to be different, is substantially as powerful as the one described above and in addition it may be obtained in substantially greater yields.

The term "modifying agents" is used in this present specification as a generic expression to include agents which are capable of bringing about great and valuable changes in the properties of lubricating oils which have the power of reducing the pour point of waxy lubricating oils and/or the power of assisting the separation of waxy constituents from lubricating oils that have been diluted with various solvents or diluents, also of dispersing and peptizing sludging constituents. The specific action of such modifying agents is not fully understood but it appears that they have the power on the one hand of changing the crystal structure of wax causing the same to form small crystals which grow only very slowly and which appear to be harder and dryer than the crystals produced in their absence, and on the other of reducing sludge forming tendency of oils.

The present method may be used in conjunction with the method described in the United States Patent No. 1,815,022 as an additional series of steps to increase the yield, or the entire synthesis may be modified according to the present invention as will be fully understood from the description below.

According to the method of the United States patent above mentioned, paraffin wax is halogenated, preferably chlorinated to the extent of 10 or 12%, and this chlorinated product is mixed with aromatic hydrocarbons such as naphthalene, preferably in the proportion of 15 parts of the latter to 100 parts of the former. It is usually desirable to add a diluent such as saturated naphtha and from 2 to 5 parts of aluminum chloride to bring about the condensation. It will be understood that other similar condensing agents such as aluminum bromide or iodide may be used, or ferric chloride, zinc chloride and boron fluoride may also be used. The condensation proceeds with vigorous stirring at a temperature between about normal room temperature and 150° C. The time taken for the reaction is preferably from about 2 to 10 hours to produce the most potent product, although it may be longer in some instances, depending on the degree of agitation, the amount of catalyst and other factors.

It has been found that the product of such reaction is not a single substance but consists of various materials of a wide molecular weight range. The lighter products are inactive, that is to say, they are not wax modifying agents and are apparently naphthalenes to which long chained paraffinic alkyl groups have been attached or such alkylated naphthalenes which have been condensed to a relatively low degree. These various materials together with the unconverted wax may be distilled, preferably under vacuum, to leave a much more potent product as a residue. In place of distillation the active wax modifiers may be separated by means of certain solvents, or more properly precipitants, because the active material is thrown down by the added solvent. Among the precipitants which can be used may be mentioned propane and other liquefied normally gaseous hydrocarbons and oxygen-containing compounds such as alcohols, ethers, ketones and esters, and mixtures thereof with each other, or with naphtha, or with liquid aromatics such as benzol and toluol. The diluted material is chilled somewhat to cause the precipitation of the active wax modifier, which can be removed by sedimentation or centrifugation and if desired the unconverted wax may be removed as a separate step by chilling to a lower temperature and repeating the sedimentation or centrifugation. This wax fraction is relatively small and may be discarded or it may be returned for rechlorination in a succeeding batch.

The solvent is then removed from the dissolved constituents by distillation or other means and the latter are condensed in a separate step with a polyhalogenated low molecular weight hydrocarbon such as carbon tetrachloride, dichlorethane, dichlorethylene, trichlorethylene, tetrachlorethylene, chlorinated gasoline or other light petroleum hydrocarbon mixtures, or equivalent materials containing other halogens. This condensation takes place under conditions similar to that used in initial condensation step, that is to say, temperatures ranging up to about 150° C. in the presence of the catalysts of the aluminum chloride type. The amount of the poly-chlor material is usually small as compared with the amount of the extracted product, being usually from ½ to ¼ of the volume thereof.

The product is washed and the sludge is separated in the usual manner. The heavy product obtained in the second condensation step is an excellent modifying agent either for pour inhibiting for wax separation or sludge dispersion. It may be kept separate or it may be blended with the primary or original condensation product. The total yield based on the wax originally chlorinated is obviously considerably greater than can be obtained from the single condensation step formerly used.

It has been found that the light oil extracted with the solvent in the process just described contains substantial amounts of alkylated aromatics containing long straight chains. It is therefore possible to carry out this invention by employing other raw materials of a similar type, e. g. octadecyl naphthalene, polydodecyl benzene, and the like. These may be condensed directly with the halogenated low molecular weight aliphatic hydrocarbon in a single step.

It should be understood that in the use of the present method chlorinated paraffin is not the only substance that can be used as its known equivalents are equally satisfactory, for example, the fluoro and the bromo products, octadecyl or octadecylene halides and the other principally straight chained hydrocarbon halides in general which contain more than 10 carbon atoms. Similarly, benzol or toluol may be substituted for naphthalene or the hydrogenated derivatives of these materials may be used, or if desired cyclic oils, for example, those obtained from naphthenic petroleum or cracked gas oils and the like may be employed.

*Example*

A valuable modifying agent was prepared by the method of U. S. 1,815,022, using 100 parts of wax chlorinated to 10 to 12% by weight with 15 parts of naphthalene. The product of the initial condensation is extracted with 3 or 4 volumes of liquefied propane and yielded the following fractions:

(1) Heavy fraction, 20 parts, excellent inhibitor.
(2) Light fraction, 80 parts, completely inactive as a pour inhibitor.

To this second fraction, which had a viscosity of about 200 seconds Saybolt at 210° F., is added an equal amount of carbon disulphide, and 32 parts of carbon tetrachloride, and 16 parts of anhydrous aluminum chloride. This mixture was stirred for 6 hours at room temperature, then washed and catalytic sludge separated.

The total product had a viscosity of 3400 seconds Saybolt at 210° F. One half percent reduced the pour point of an oil (30° F. pour) to 10° F., and 1% reduced the same to 0° F., which corresponded closely to the potency of the original condensate.

The total yield amounted to approximately 90 parts, based on the original chlorinated wax, of an inhibitor which is capable of reducing the pour point of the particular oil from 30° F. to 0° F. when used in concentration of 1%.

The product was also an active separation aid which caused wax to rapidly settle from a diluted and chilled waxy oil. When used in proportion of ½% in a lubricating oil the Sligh value is reduced to about one half of the previous value.

The present invention is not to be limited to any theory of inhibitor action nor to any particular method of using the wax separation aids whether in connection with a centrifugal or filtration or sedimentation process but only to the following claims in which the invention is to be protected in its fullest scope.

We claim:

1. An improved method for producing wax modifying agents, which comprises condensing halogenated paraffin wax with an aromatic hydrocarbon at low temperatures with a catalyst of the type of aluminum chloride and after the initial condensation stage is substantially complete, separating the lighter inactive reaction intermediate products so produced from heavier active products and recondensing said separated lighter inactive products with a low molecular weight aliphatic poly halo-hydrocarbon derivative whereby the yield of wax modifiers is increased.

2. Process for producing wax modifying agents which comprises the steps of condensing halogenated paraffin wax with an aromatic hydrocarbon at a low temperature with aluminum chloride in an initial stage, separating lighter inactive reaction products from heavier active fractions and recondensing such separated inactive lighter reaction fractions with a low molecular weight aliphatic poly halo-hydrocarbon derivative whereby an additional yield of wax modifier is obtained.

3. Process according to claim 2 in which the active and the inactive products of the first mentioned condensation are separated by solvent extraction before recondensation.

4. Process for producing wax modifying agents which comprises condensing paraffin wax chlorinated to about 10 or 12% by weight with naphthalene by means of aluminum chloride at a low condensation temperature in an initial stage, separating lighter inactive intermediate reaction products from the active wax modifier produced thereby, recondensing the said separated inactive reaction products with carbon tetrachloride by means of aluminum chloride at low condensation temperatures whereby the yield of active wax modifiers is increased.

5. Process for producing wax modifying agents which comprises condensing paraffin wax chlorinated to about 10 to 12% by weight with naphthalene by means of aluminum chloride at a low condensation temperature whereby there are formed high molecular weight condensation products which are active wax modifying agents and less viscous intermediate condensation products which are inactive as wax modifying agents, separating the intermediate condensation products from the active modifier produced and recondensing the said intermediate condensation products with carbon tetrachloride by means of aluminum chloride at low condensation temperature to produce active wax modifiers.

JEFFREY HOBART BARTLETT.
ANTHONY H. GLEASON.